Figure 1:
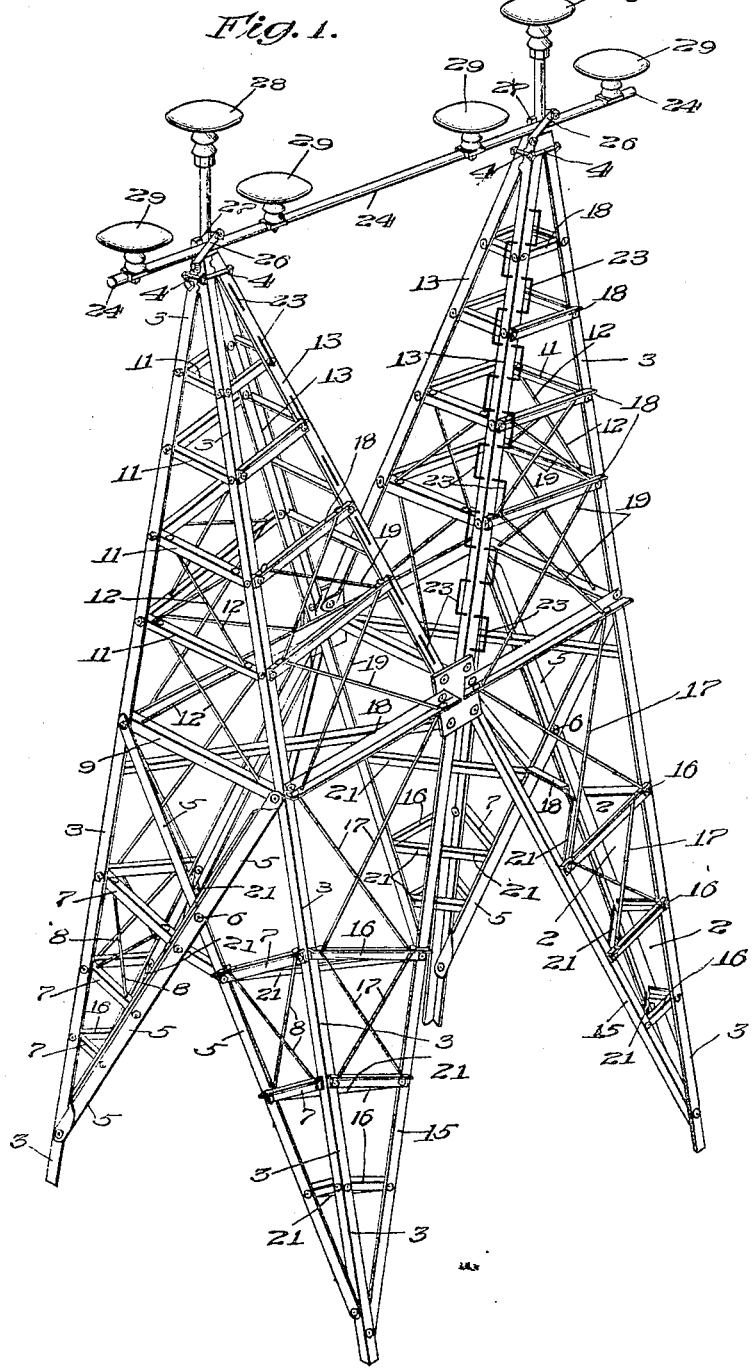

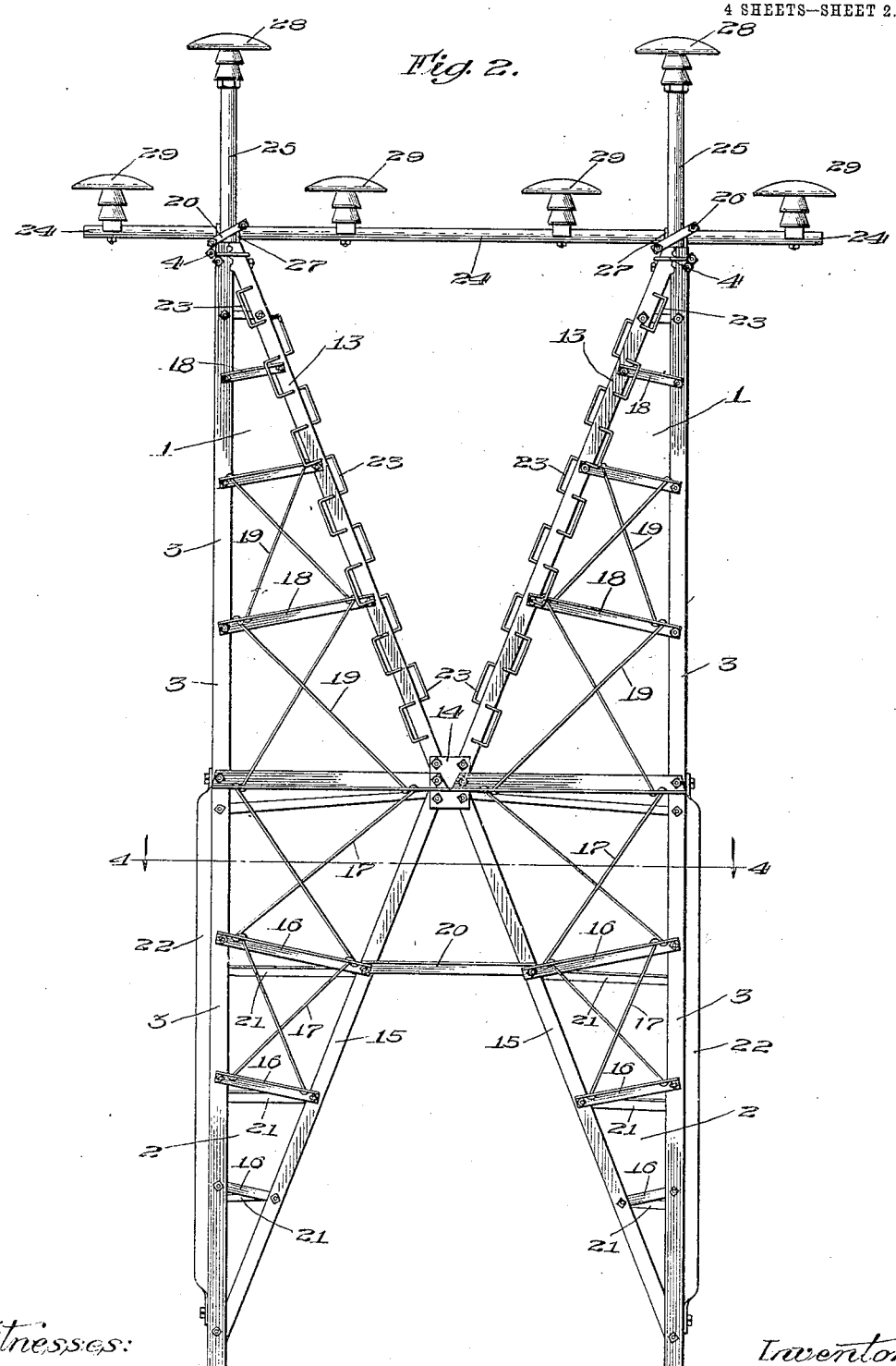

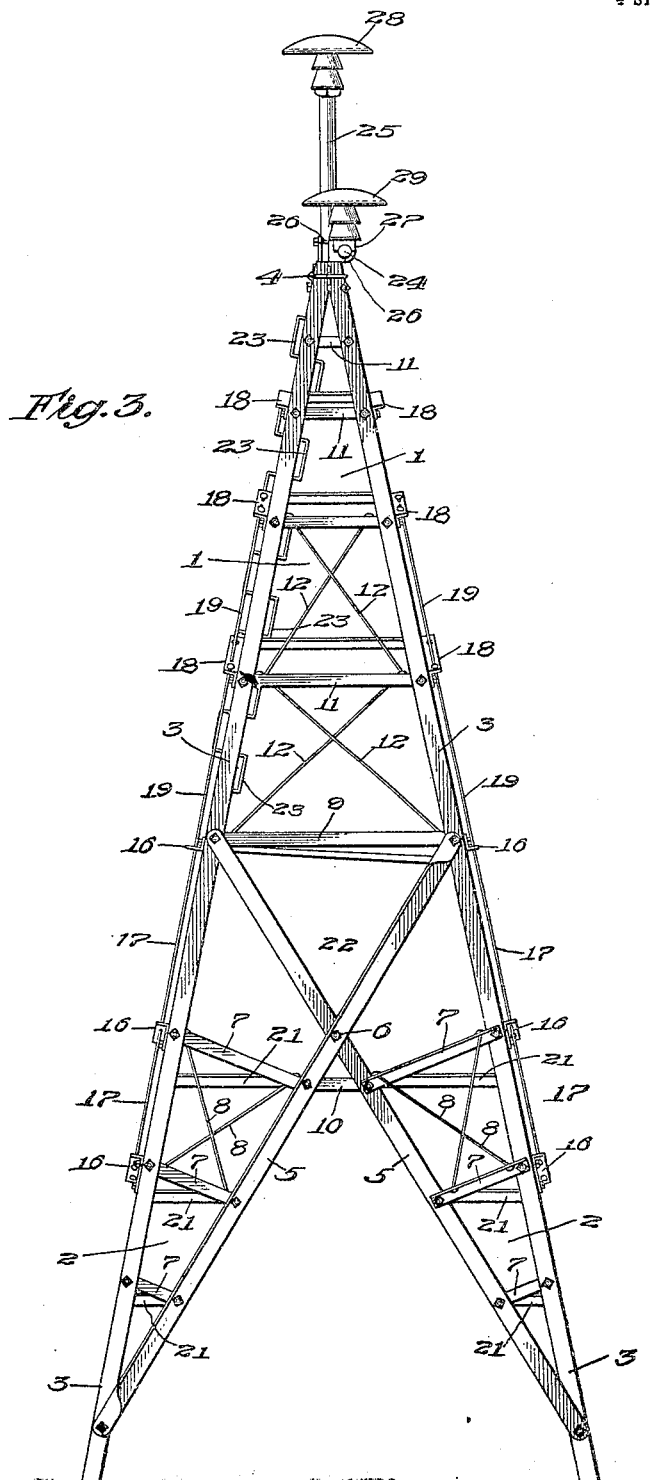

No. 800,935. PATENTED OCT. 3, 1905.
LA VERNE W. NOYES.
ELECTRIC WIRE TOWER.
APPLICATION FILED FEB. 11, 1904.
4 SHEETS—SHEET 4.
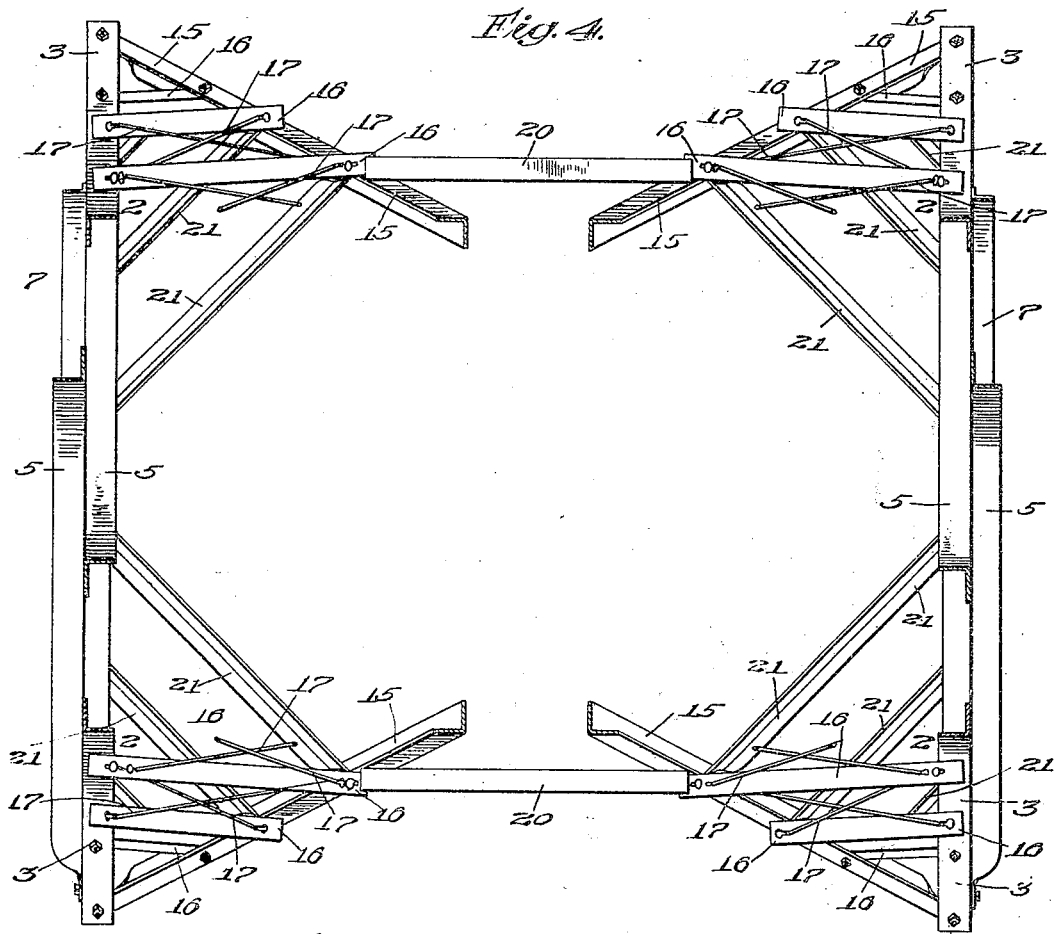
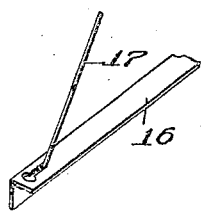
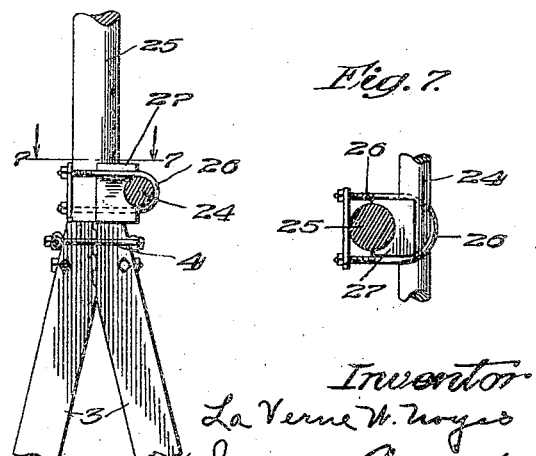
Witnesses:
Robert H. Weir
W. Perry Hahn
Inventor
La Verne W. Noyes
by Jones & Addington
Attorneys.

UNITED STATES PATENT OFFICE.

LA VERNE W. NOYES, OF CHICAGO, ILLINOIS.

ELECTRIC-WIRE TOWER.

No. 800,935.  Specification of Letters Patent.  Patented Oct. 3, 1905.

Application filed February 11, 1904. Serial No. 193,107.

*To all whom it may concern:*

Be it known that I, LA VERNE W. NOYES, a citizen of the United States, residing at Chicago, in the county of Cook and State of Illinois, have invented a certain new and useful Improvement in Electric-Wire Towers, of which the following is a full, clear, concise, and exact description, reference being had to the accompanying drawings, forming a part of this specification.

My invention relates to an electric-wire tower, and more particularly to a built-up tower of structural iron.

The object of my invention is to provide a tower of this character which will be strong and stable and which will effectively withstand the strains to which such a tower is subjected.

A further object of my invention is to construct a tower in which the bracing-posts will be so arranged that ample space will be allowed beneath the same to permit persons or animals to pass beneath the bracing part without interference and in this manner provide a tower which occupies small space.

In accordance with my invention I provide a skeleton tower formed from structural iron which possesses unusual strength and stability, due to its manner of construction.

One of the features of the tower which is peculiarly advantageous in a skeleton tower for any of the uses for which such a tower may be applied is the provision of the downwardly-extending supporting-legs, each formed from a plurality of converging members suitably braced.

Another feature of the invention which peculiarly adapts it to certain uses, among which is the support of electric wires, is the provision of a plurality of upwardly-extending pyramidal arms. These pyramidal arms may be formed in a variety of ways; but I prefer to form them by employing two triangular end frames coöperating with angularly-extending members to form the pyramidal structures. When the tower is employed for the support of electric wires, the use of a pair of upwardly-extending pyramidal arms in this way will be found to give very advantageous results since the arms are able to effectively withstand the varied strains to which such a tower will be subjected. I preferably form each of these pyramidal arms by the employment of four converging posts suitably braced laterally; but it will be understood that while such a four-post construction is considered by me to be the preferable form the novel results of my invention may be secured by modified arrangements. The upright four-post arms carry upon the ends the cross-arm or other structure for supporting the wires.

My invention is peculiarly adapted for the carrying of large and heavy wires and cables and for the carrying of wires of high-tension alternating-current systems of the single-phase or multiphase variety. While my invention is peculiarly adapted for this class of work, it will be understood that it is applicable to the carrying of wires and cables of any kind and is also applicable to any other use for which a tower of this kind and construction might be desirable.

I have illustrated my invention in the accompanying drawings, in which—

Figure 1 is a perspective view of the tower of my invention. Fig. 2 is a side view of the tower in elevation. Fig. 3 is a view of the tower in full. Fig. 4 is a sectional view on line 4 4 of Fig. 2. Fig. 5 is a detail view showing the means for attaching the ends of the tie-rods. Fig. 6 is a detail view showing the manner of securing the cross-arm and insulator-supports in position. Fig. 7 is a sectional view on line 7 7 of Fig. 6.

As appears from the drawings, the particular skeleton tower which I have illustrated for the purpose of disclosing my invention consists of a pair of upright arms 1 1, each consisting of four converging posts suitably braced and four downwardly-extending legs 2 2, each leg consisting of three converging posts. The tower thus has four equidistant legs, affording a stable support and foundation. Moreover, each of these legs is constructed so that any tendency of the tower to sway or twist is effectually resisted. The upright arms, each consisting of four converging posts, afford rigid and unyielding structures which effectively carry the weight of the wires imposed thereon and effectively resist tendencies to sway or twist under the strains to which the same are subjected.

Analyzing the structure of the tower, it will be noted that the end pieces or frames are triangular in shape, and are formed of two converging posts 3 3, the lower ends of these posts forming the ends of the legs and the upper ends being mechanically united in any suitable manner. I prefer to unite these ends as illustrated, wherein the angle-bars, comprising the posts 3 3, have their opposed flanges dovetailed to securely fit together, the same being bound together by means of a clamp 4. These posts 3 3 are preferably formed from angle-bars, as illustrated. Extending from a point near the middle of each post to a point near the bottom of the opposite post are the bracing-posts 5 5, which are preferably secured together by means of a bolt 6 at their intersection. These posts 5 5 are braced to the upright posts 3 by means of lateral bars 7 7. These bracing-bars 7 7 extend perpendicular to a line bisecting the angle between the posts 5 and 3 and are thus of the shortest possible length to extend between the two posts and occupy positions wherein they impart maximum strength to the structure. Tie-rods 8 8 extend between the longer lateral bars 7 7 to securely tie the members of the structure together. The lateral bars 7 are preferably angle-bars, and the tie-rods are preferably secured thereto, as indicated in Fig. 5, wherein the enlarged head on the tie-rod is shown as fitted into a keyhole-slot in the bar. This form of connection permits the tie-rods to be readily placed in position, thus materially reducing the cost of erection.

A transverse bar 9 extends between the posts 3 3 near the middle, and a cross beam or bar 10 extends between the posts 5 5, as illustrated. Transverse bars 11 11 extend between the posts 3 3, as illustrated, and the longer of these are secured together by means of tie-rods 12 12. The posts and bracing beams or bars are preferably made of angle-iron, and the posts are disposed as illustrated, so that the same may rest in flat contact without the necessity of cutting away the flanges. The ends of the longer posts or beams are preferably formed of double thickness by flattening the flanges so that they will rest in parallel positions, as illustrated in connection with the posts 5 5.

The structure above described constitutes a triangular frame which may be termed the "end" frame, and there are two of these end frames—one at each end of the tower—and these frames occupy parallel positions. These end frames are held in position by diagonal bracing-frames. Posts 13 13 extend from the upper ends of the side frames to a tie-plate 14, and posts 15 15 extend from this tie-plate to points near the lower ends of the posts 3 3. The posts 13 and 15 are practically continuous through the agency of the tie-plate, and thus extend from the upper end of one end frame to the lower end of the other end frame. Each of these diagonal frames thus consists of two posts, the lower ends being secured to points near the lower ends of the legs of the tower and the upper ends converging and being secured to the upper end of the opposite end frame. The posts 3 and 15 are braced together by means of bracing bars or beams 16 16 and tie-rods 17 17. Posts 3 and 13 are braced by means of the bracing bars or beams 18 18 and tie-rods 19 19. The posts 15 15 are also braced by a bracing bar or beam 20. Posts 15 and 5 are braced by means of bracing bars or beams 21 21.

The posts 13 13 may be provided with ladders 23 23, as illustrated, to permit the ready ascent of the tower. The ladders do not extend down the legs of the tower, as it is preferable that a removable ladder be employed for gaining access to the lower ends of the ladders 23 to prevent unauthorized persons from ascending the tower. However, the matter of ladders for the ascent of the tower is optional.

It will be noted that the skeleton tower which I have illustrated comprises two triangular end frames coöperating with angularly-disposed members to form the two upwardly-extending arms. It will be noted, moreover, that these two triangular end frames coöperate with angularly-disposed members to form four downwardly-extending legs. These legs, as illustrated, diverge, while the longitudinal members of each leg converge toward the lower ends. It is apparent that the pyramidal-arm construction of my invention may be employed in connection with a base or supporting portion of any desired form, and it is apparent, moreover, that the base or supporting portion comprising the plurality of downwardly-extending legs may be used in connection with a superstructure other than the two-armed arrangement. The claims hereinafter appended are drawn with respect to the several independent features of invention.

As before stated, any desired form of supporting device for the wires, cables, or other parts may be employed. I have illustrated a system of supporting devices designed for commercial purposes and adapted more particularly to the carrying of high-tension wires in multiphase alternating-current systems. The tower, as illustrated, is adapted to carry the wires for two three-phase systems. I provide a cross arm or beam 24, which in the present instance is circular in cross-section, and I provide upright posts or masts 25 25, which in the present instance are also circular in cross-section. The upright posts or masts 25 are secured to the converging ends of the posts forming the upright arms of the towers, the posts being clamped between the converging dovetailed ends of the angle-bars constituting said posts, the clamp 4 serving to hold the ends of the angle-bars together and to clamp the posts 25 between the same. The cross-beam 24 is secured to the upright posts 25 by means of a clamp 26, a block 27 being interposed between the posts 25 and the cross-beam 24. Insulators 28 are mounted upon the upright posts 25, and insulators 29 are mounted upon the cross-beam 24. By carrying insulators upon the upright arms 25 the insulators may be placed at the regulation distance apart, while materially reducing the width of the tower.

Any suitable wire-supporting devices may be carried upon the cross-beam and the masts. I have illustrated ordinary insulators commonly employed for carrying wires traversed by high-tension currents. The wire-supporting devices may be of any approved form. It will be noted that three wire-supporting devices are associated with each of the upwardly-extending pyramidal arms, and these three wire-supporting devices are located at the corners of a triangle. By making this triangle with equal sides it is apparent that the wires carried by the insulators will rest at equal distances apart. By the employment of the masts in connection with the cross-beam I am enabled to conveniently support six wires with a minimum width of tower and a maximum separation between the individual wires. As illustrated in the drawings, the wire-supporting devices are so disposed that there is the same distance of separation between any two wires of the system. By this disposition a large number of wires can be accommodated by a tower of minimum width. The wider the tower, of course, the more expensive its structure and the more difficulty in building the same to effectively withstand the strains to which it is subjected. While I preferably employ the masts and consider this one of the important features of my invention in connection with the pyramidal arms, I appreciate the fact that the invention can be utilized without the employment of the masts and with other disposition of the wire-supporting devices than that specifically illustrated in the drawings. I have, however, in disclosing my invention illustrated what I consider to be the most approved and the most highly-developed form of the invention; but it is apparent that some of these preferred features may be omitted without sacrificing the spirit of the invention. I have pointed out in the appended claims in each instance the elements of construction toward which the particular claim is directed.

While I have described my invention in connection with a form of tower which I have worked out for commercial purposes, it will be understood that my invention is susceptible of numerous changes and modifications in matters of structural detail, and I do not wish to limit myself to any features of detail except as set forth in the appended claims.

Having described my invention, what I claim as new, and desire to secure by Letters Patent, is—

1. A tower having a pair of upright supporting-arms and four downwardly-extending laterally-inclined legs, said legs diverging toward their lower ends.

2. A tower having a pair of upwardly-extending four-post supporting-arms, and four downwardly-extending three-post legs, substantially as described.

3. A tower having a pair of upwardly-extending four-post supporting-arms, and four downwardly-extending laterally-diverging legs.

4. A tower having a plurality of downwardly-extending three-post legs the posts of each converging toward the lower ends, the posts of each leg being substantially straight and laterally braced.

5. A tower having four downwardly-extending three-post legs the posts of each converging toward the lower ends, the posts of each leg being substantially straight and laterally braced.

6. A tower comprising a pair of triangular upright end frames, and a pair of diagonal bracing-frames.

7. A tower having a pair of upright end frames of triangular form, and a pair of diagonal bracing-frames of triangular form.

8. A tower having a pair of triangular upright end frames of structural iron comprising converging posts and suitable bracing, and a pair of triangular diagonal bracing-frames, comprising converging posts and suitable bracing.

9. A tower comprising a pair of upright end frames, each of said end frames consisting of two converging main posts, and a pair of bracing-posts, each bracing-post extending from a point near the lower end of a main post to an intermediate point of the opposite main post and suitable bracing between said end frames.

10. A tower comprising a pair of upright end frames, each of said end frames consisting of two converging main posts, and a pair of bracing-posts, each bracing-post extending from a point near the lower end of a main post to an intermediate point of the opposite main post and diagonal bracing-frames between said end frames.

11. A tower formed by combining two four-post towers, the outer frames of each of said towers being held vertical or upright, and the inner frames extending diagonally between said outside frames.

12. A tower having a plurality of downwardly-extending three-post legs, the posts of each leg being diagonally arranged and converging toward a common point.

13. A tower having a plurality of downwardly-extending legs, each leg comprising a corner-post and two diagonally-arranged side posts.

14. A tower having a plurality of downwardly-extending diverging legs, each leg comprising a corner-post and two diagonally-arranged side posts.

15. A tower having a plurality of downwardly-extending diverging legs, each leg comprising a corner-post and two diagonally-arranged side posts, said posts converging toward a common point at their lower ends.

16. A skeleton tower comprising two triangular end frames and angularly-extending members coöperating therewith to form a plurality of upwardly-extending pyramidal arms.

17. A skeleton tower comprising two triangular end frames and angularly-extending members coöperating therewith to form a plurality of upwardly-extending pyramidal arms and a wire-supporting cross-beam carried upon the ends of said arms.

18. A skeleton tower comprising two triangular end frames and angularly-extending members coöperating therewith to form two upwardly-extending pyramidal arms and four downwardly-extending pyramidal legs.

19. A tower comprising two triangular end frames and angularly-extending members coöperating therewith to form two upwardly-extending pyramidal arms and four downwardly-extending pyramidal legs and a wire-supporting cross-beam carried upon the ends of said arms.

20. A skeleton tower for supporting wires, comprising a skeleton frame having a pair of upwardly-extending pyramidal arms and a wire-supporting cross-beam carried upon the ends of said arms, whereby wires may be carried by the cross-beam and the strains imposed thereby may be effectively withstood by the skeleton frame.

21. A skeleton tower for supporting wires, comprising a skeleton frame having a pair of upwardly-extending pyramidal arms, a wire-supporting cross-beam carried upon the ends of said arms, and a wire-supporting mast carried upon the end of each of said arms.

22. A skeleton tower for supporting wires, comprising a skeleton frame having a pair of upwardly-extending pyramidal arms, a cross-beam carried upon said arms and having projecting ends, four wire-supporting devices on said cross-beam, two being situated between said arms and one on each of the projecting ends of the cross-beam.

23. A skeleton tower for supporting wires, comprising a skeleton frame having a pair of upwardly-extending pyramidal arms, a cross-beam carried upon said arms and having projecting ends, four wire-supporting devices on said cross-beam, two between the said arms and one on each of said projecting ends, a mast carried upon the end of each of said arms, and a wire-supporting device upon each of said masts.

24. A skeleton tower for supporting wires, comprising a skeleton frame having a pair of upwardly-extending pyramidal arms, and a pair of wire-supporting masts, one carried upon the end of each of said arms.

25. A skeleton tower for supporting wires, comprising a skeleton frame having a pair of upwardly-extending pyramidal arms, a pair of masts, one carried upon the end of each of said arms, and a wire-supporting device carried upon each of said masts.

26. A skeleton tower for supporting wires, comprising a skeleton frame having a pair of upwardly-extending pyramidal arms, and wire-supporting devices arranged one upon each side of each arm and one upon the top of each arm, whereby six wires may be supported upon a tower of minimum width with maximum separation between the wires.

27. A skeleton tower for supporting wires comprising a rectangular frame substantially midway the length of the tower, a pair of four-post pyramidal arms extending upward from said rectangular frame, and four three-post pyramidal legs extending downward from said rectangular frame.

28. A skeleton tower for supporting wires, comprising a rectangular frame substantially midway the length of the tower, a pair of four-post pyramidal arms extending upward from said rectangular frame, four three-post pyramidal legs extending downward from said rectangular frame, a cross-beam carried by said arms, and a mast upon each of said arms, and wire-supporting devices, whereby six wires may be supported on a tower of minimum width with maximum separation between the wires.

29. A skeleton tower for supporting wires, comprising a skeleton framework having triangular end frames and angularly-disposed members forming a pair of pyramidal four-post arms extending upward from an intermediate rectangular frame and having four pyramidal legs extending downward from an intermediate rectangular frame, whereby the tower will effectively withstand any downward, lateral or torsional strains to which the same is subjected.

In witness whereof I have hereunto subscribed my name in the presence of two witnesses.

LA VERNE W. NOYES.

Witnesses:
   EDWIN B. H. TOWER, Jr.,
   M. R. ROCHFORD.